United States Patent
Wang

(10) Patent No.: US 6,675,385 B1
(45) Date of Patent: Jan. 6, 2004

(54) HTML ELECTRONIC PROGRAM GUIDE FOR AN MPEG DIGITAL TV SYSTEM

(75) Inventor: Jeffrey Yutong Wang, Horsham, PA (US)

(73) Assignee: Liberate Technologies, San Carlos, CA (US)

( * ) Notice: Subject to any disclaimer, the term of this patent is extended or adjusted under 35 U.S.C. 154(b) by 0 days.

(21) Appl. No.: 09/176,511

(22) Filed: Oct. 21, 1998

(51) Int. Cl.$^7$ .............................................. H04N 5/445
(52) U.S. Cl. ............................ 725/39; 725/50; 725/51; 725/54; 725/56
(58) Field of Search ............................ 725/39, 44, 48, 725/50, 51, 54, 56

(56) References Cited

U.S. PATENT DOCUMENTS

| | | |
|---|---|---|
| 5,027,400 A | 6/1991 | Baji et al. |
| 5,515,106 A | 5/1996 | Chaney et al. |
| 5,541,738 A | 7/1996 | Mankowitz |
| 5,559,548 A | 9/1996 | Davis et al. |
| 5,576,755 A | 11/1996 | Davis et al. |
| 5,579,055 A | 11/1996 | Hamilton et al. |
| 5,592,551 A | 1/1997 | Lett et al. |
| 5,596,373 A | 1/1997 | White et al. |
| 5,600,378 A | 2/1997 | Wasilewski |
| 5,630,119 A | 5/1997 | Aristides et al. |
| 5,652,613 A | 7/1997 | Lazarus et al. |
| 5,666,645 A | 9/1997 | Thomas et al. |
| 5,734,589 A * | 3/1998 | Kostreski et al. ........... 364/514 |
| 5,737,030 A | 4/1998 | Hong et al. |
| 5,760,821 A | 6/1998 | Ellis et al. |
| 5,793,438 A | 8/1998 | Bedard |
| 5,801,753 A | 9/1998 | Eyer et al. |
| 5,818,935 A | 10/1998 | Maa |
| 5,982,445 A * | 11/1999 | Eyer et al. ................... 348/461 |
| 6,018,764 A | 1/2000 | Field et al. |
| 6,151,059 A * | 11/2000 | Schein et al. .................. 348/13 |
| 6,182,094 B1 * | 1/2001 | Humpleman ................. 707/513 |
| 6,216,265 B1 * | 4/2001 | Roop et al. ..................... 725/54 |
| 6,240,555 B1 * | 5/2001 | Shoff .......................... 725/110 |
| 6,360,275 B1 * | 3/2002 | Chu et al. .................... 709/245 |
| 6,459,427 B1 * | 10/2002 | Mao et al. |

FOREIGN PATENT DOCUMENTS

| | | |
|---|---|---|
| EP | 0 680 216 A | 11/1995 |
| EP | 0 810 790 A | 12/1997 |
| EP | 0 811 940 A | 12/1997 |
| EP | 0 827 336 A | 3/1998 |
| EP | 0 837 599 A | 4/1998 |
| EP | 0 838 951 A | 4/1998 |
| EP | 0 848 553 A | 6/1998 |
| EP | 0 851 681 A | 7/1998 |
| WO | PCT/US96/15465 A1 | 4/1997 |
| WO | WO 98 26584 A | 6/1998 |

\* cited by examiner

*Primary Examiner*—Andrew Faile
*Assistant Examiner*—Kieu-Oanh Bui
(74) *Attorney, Agent, or Firm*—Allan Jacobson

(57) ABSTRACT

An MPEG-2 digital TV headend and settop box includes a method and apparatus for enabling the presentation of electronic program guide (EPG) information. Television program guide information is downloaded from a source of television programming data to the headend of the TV broadcast system. The downloaded EPG data is translated into a plurality of HTML Web pages, which are continuously transmitted as a rotating data carousel in an MPEG-2 data stream. The digital TV settop box further includes a general-purpose web browser responsive to viewer commands to select and display a selected web page from the rotating carousel of HTML web pages. The digital TV settop further includes a data cache for downloading and storing partial HTML web page EPG information in advance, which reduces the necessary bandwidth allocated for the EPG information, and allows the settop box to quickly display the basic information for a channel related program guide.

14 Claims, 7 Drawing Sheets

FIG. 6

MoreTopics (TM) Wednesday, Aug 5, 1998

Movies
Sports
News
Specials
Shopping

FIG. 7

MoreMovies (TM) Wednesday, Aug 5, 1998

| Title | Time | Channel |
|---|---|---|
| Far from Home | 5:00pm | CHN#68 |
| Blankman | 6:00pm | CHN#74 |
| River Wild | 6:30pm | CHN#10 |
| Philadelphia | 7:00pm | CHN#6 |

FIG. 8

MoreAttractions(TM) Wednesday, Aug 5, 1998

NFL
Dallas at Jacksonville, 8p.m. (ESPN)
Green Bay at Denver, 8p.m. (ABC)
Music
49th Annual Primetime Emmy Awards, 8p.m. (CBS)

FIG. 9

 UPN 113

Star Trek: Voyager
The Gift

Network Series / Science Fiction
TV-PG

9:00pm - 10:00pm
As Kes' life as she knows it comes to an end, she gives her crewmates an amazing gift.

Cast:
Kate Mulgrew as Kathryn Janeway
Robert Beltran as Chakotay
Jennifer Lien as Kes

FIG. 10

UPCOMING EPISODE

BRIEFING

The Gift
Production 870
First Air Date: 9/10/97
Stardate Unknown

PADD

ABOUT

Kes knows it s time to leave the U.S.S Voyager when her body goes into a state of cellular flux and she experiences uncontrollable psychokinetic abilities which endanger the ship. Before Kes has her final moments of life as she knows it and enters a higher realm of existance, she gives her crewmates an amazing gift. Meanwhile, Seven of Nine's human physiology begins to reassert itself and threaten her life. When Janeway instructs The Doctor to completely remove her Borg technology, a fierce yet alluring young female begins to emerge.

Cast:

Kate Mulgrew as Katheryn Janeway
Robert Beltran as Chakotay
Roxann Dawson as B Elanna Torres
Robert Duncan McNeill as Tom Paris
Jennifer Lien as Ken
Ethan Phillips as Neelix
Robert Picardo as The Doctor
Tim Russ as Tuvok
Jeri Ryan as Seven of Nine
Garrett Wang as Harry Kim Guest Cast:

Creative staff:

Director: Winrich Kolbe
Story By:
Screenplay By:
Teleplay By: Joe Menosky
Written By: Kenneth Biller & Jack Klein & Karen Klein Archives:

PHOTO-janeway helps the new crewmember Seven of Nine.
VIDEO-This is a clip of the televised preview for the episode. The approximate file size is 2 megabytes.
VIDEO-This is a clip of the televised preview for the episode. The approximate file size is 2 megabytes.

HTML ELECTRONIC PROGRAM GUIDE FOR AN MPEG DIGITAL TV SYSTEM

FIELD OF THE INVENTION

The present invention relates to electronic program guides (EPG) for digital television systems. In particular, the present invention relates to the transmission of electronic program guide data in hypertext markup language (HTML) in an MPEG digital television system.

BACKGROUND OF THE INVENTION

The Federal Communications Commission (FCC) recently approved a digital television format based on the Moving Picture Experts Group 2 (MPEG-2), as a standard for the transmission of digital TV in the United States. The MPEG-2 digital television format provides improved picture and sound quality. In addition, the MPEG-2 digital television format permits the digital TV signal to carry ancillary digital data, which facilitates additional services based on the ability of the digital TV signal format to efficiently transport digital data.

Electronic program guide (EPG) systems are known. A typical electronic program guide system, embodied in a settop box such as a satellite receiver or cable TV decoder (or in the TV receiver itself), receives a database of TV programming information (basic EPG data) encoded in a digital data format, broadcast over a satellite, cable or terrestrial channel. For example, one type of EPG system broadcasts a digital database of EPG data in the vertical blanking interval of an analog television signal. The EPG database is received at the settop, decoded locally and stored in local memory.

Responsive to viewer requests, the locally stored EPG database in local memory is then formatted from basic EPG data into a program guide EPG display form that can be displayed on the TV screen. The simplest EPG display is a TV programming grid, organized as channel versus time, similar to the typical programming grid appearing in a printed paper television guide. The locally stored basic EPG data is typically searched and sorted responsive to each viewer request, and the resulting guide information is generated and displayed on the TV screen. For example, the viewer may request a list of all sports events, or a list of all movies broadcast on that day, or on a future day. Responsive to each request, the processor in the settop searches, sorts and formats the locally stored EPG database into a customized EPG display.

Prior art EPG systems typically require a large local memory to store the EPG database, and a fast local processor to search, sort and display the EPG data.

In comparison with printed TV program guides, electronic program guides offer larger capacity, electronic searching, last minute updates, and other features such as searching and sorting that are not practical with printed paper guides. More recently, on line television guides via the Internet provide an alternative to on-screen television guides and printed paper guides. However, Internet services and on-line TV guides are designed for a two-way network model, as compared to broadcast TV and associated on-screen TV guides, which are designed for a one way network model.

Despite the competition from paper television guides and personal computer on-line television guides, the broadcast TV screen is the best place to view program guide information. It is more convenient for viewers to search for TV related information on the TV itself, rather than in some other place, such as a paper magazine or a home office personal computer. The EPG feature has proven to be attractive to viewers, and is one of the most important data applications for TV networks. The present invention provides an EPG solution for a one way broadcast digital TV network.

SUMMARY OF THE INVENTION

In accordance with the present invention an electronic program guide is embodied in a rotating data carousel of HTML pages formatted to be transported in the data packets of an MPEG-2 data stream. First, at the headend of the broadcast system, the basic EPG data is formatted into HTML and related data formats as the page description language for the presentation of EPG content.

Hypertext Markup Language and the related standards that comprise most Web content (i.e., image formats, style sheets, etc.) provide a thorough framework for describing the presentation of multimedia content. An HTML-based EPG leverages the huge base of tools, media, and know-how that has been developed for the Web. Prior art on-screen EPG implementations on cable TV settop boxes and satellite receivers typically use some sort of proprietary storage and display format. In the present invention, an on-screen EPG is implemented using standard Internet based Web HTML format.

Next, in accordance with the present invention, the EPG in HTML format is partitioned into MPEG-2 data packets for transport over an MPEG-2 digital television network, while retaining the HTML format. The EPG in HTML format is transmitted as a rotating data carousel of HTML pages, along with control maps that allow the viewer to navigate among the HTML Web pages of the EPG. In such manner, the normally two-way network model of the World Wide Web is adapted for use in a one-way MPEG-2-based digital TV network by broadcasting a rotating carousel comprising an ensemble of EPG Web pages plus control maps for navigation, in an MPEG-2 digital TV signal. Since the MPEG-2 settop box uses the control maps to navigate among a rotating carousel of HTML Web pages, the need for local memory to store basic EPG data is reduced. Also, since the MPEG-2 settop receives previously composed EPG display pages in HTML format, the need for local processing power to search and sort the basic EPG data, and to generate proprietary on-screen TV displays is reduced. Settop boxes tend to require Internet service in addition to EPG service. The present EPG is much more efficient in terms of processing power and cost compared with running an Internet service in parallel to a proprietary EPG service.

Television settop boxes, like most consumer electronic devices, are cost-sensitive. Manufactures make great efforts to reduce the cost of settop boxes. As a result of cost reduction measures, TV settop boxes have less local memory and a relatively slower microprocessor as compared to the memory size and processing speed of personal computers. In terms of memory and speed, settop TV boxes are resource-deprived. The present invention is adapted for use with such resource-deprived settop boxes to process and display EPG Web pages with satisfactory performance.

BRIEF DESCRIPTION OF THE DRAWINGS

FIG. 6 is a program guide Web page illustrating a Topic Guide Page in HTML format in accordance with the present invention.

FIG. 7 is a program guide Web page illustrating a Movies Topic Guide Page in HTML format in accordance with the present invention.

FIG. 8 is a program guide Web page illustrating an Attractions Guide Page in HTML format in accordance with the present invention.

FIG. 9 is a program guide Web page illustrating a simple broadcast Channel Guide Page in HTML format in accordance with the present invention.

FIG. 10 is a program guide Web page illustrating a more detailed broadcast Channel Guide Page for the broadcast Channel Guide Page of FIG. 9 in HTML format in accordance with the present invention.

DETAILED DESCRIPTION

Figure 1:
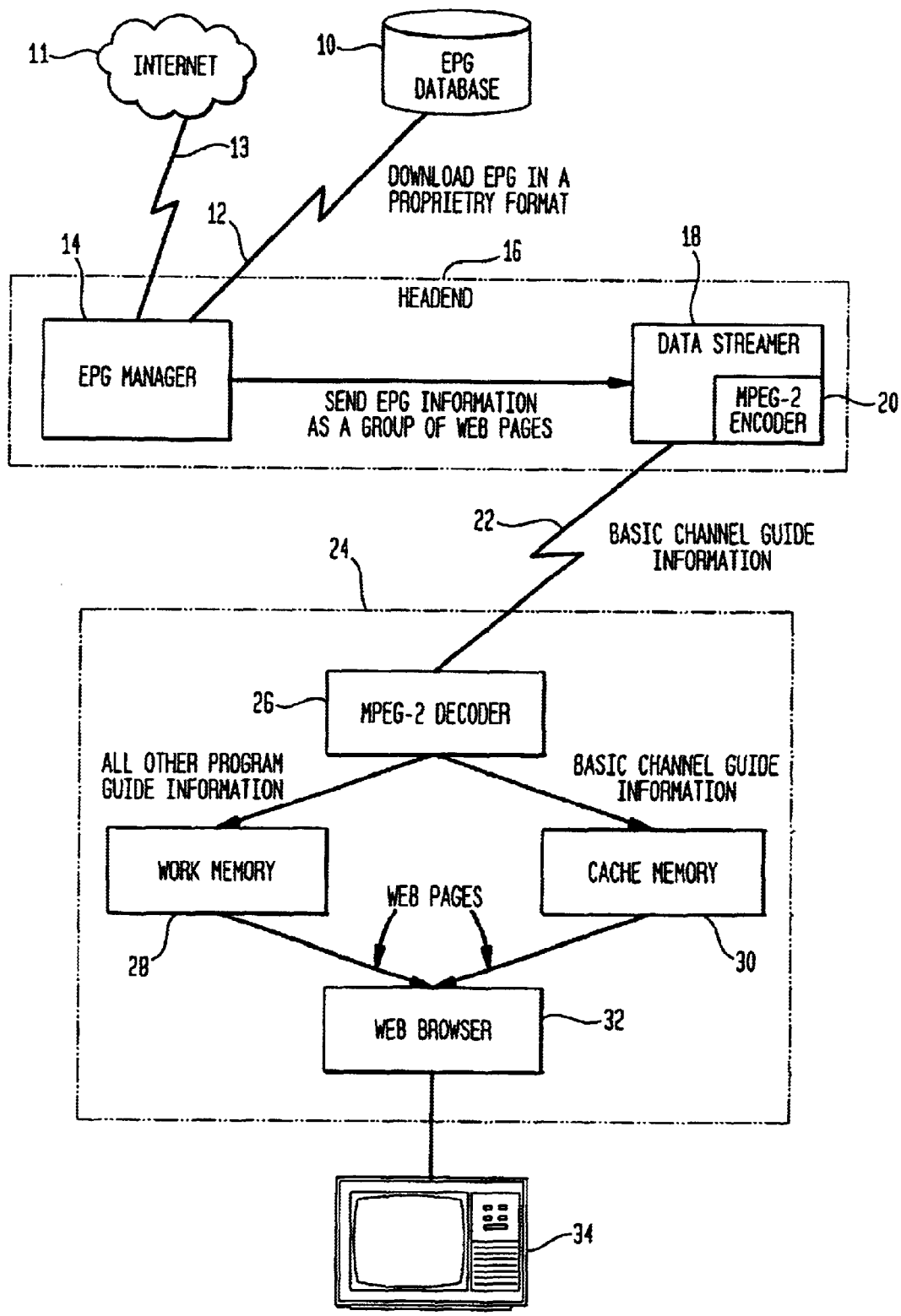
FIG. 1 is a block diagram of a broadcast digital television system incorporating an electronic program guide in accordance with the present invention.

A block diagram of an end-to-end broadcast digital TV system embodying an EPG system in accordance with the present invention is shown in FIG. 1. The overall system includes an external EPG database 10, coupled by a secure data link 12 to a CATV headend 16, and a settop box 24 coupled to the CATV headend 16 via a broadband CATV distribution system 22. The headend 16 is also coupled to the Internet 11 via a suitable Internet access connection 13. The external EPG database 10, which consists of basic EPG data, is available from any one of a number of suitable commercial data suppliers, such as TVData, Glen Falls, N.Y. 12801 US. Secure link 12 is typically a dial up telephone line.

The headend 16 includes a computer running a software entity, EPG Manager 14 that is dedicated to processing EPG information. The headend 16 further includes another software entity termed Data Streamer 18, which controls an MPEG-2 encoder 20.

The settop box 24 includes an MPEG-2 decoder 26, a working memory 28 and a temporary cache memory 30. Settop box 24 further includes a World Wide Web browser program 32 running on a microprocessor in the settop box 24. The general-purpose browser 32, is any one of a number of popular Web browsers like Microsoft Internet Explorer or Netscape Navigator. The viewer uses the browser 32 to parse, layout and render the EPG Web pages for display on TV receiver 34 at the viewer's location.

In operation, the EPG Manager 14 downloads basic EPG data from external EPG database 10 in a predetermined data format, and stores the basic EPG data in a local database at the CATV headend 16. Updated EPG data 10 is periodically downloaded 12 by the EPG manager 14 on a regular basis, such as for example, once per day.

The EPG Manager 14 generates a set of Web pages responsive to the locally stored basic EPG data. Generated EPG Web pages are in HTML format. Each generated EPG Web page is assigned a Uniform Resource Locator (URL) as its unique identifier. One of the generated EPG Web pages is designated as the EPG home page and contains URL links to one or more of the other EPG Web pages. All of the EPG Web pages are linked together by cross-reference to each respective URLs of each other EPG page to permit navigation between the EPG Web pages that comprise the EPG of the present invention. EPG manager 14 via its access 13 to the Internet 11 has the option of downloading other Web pages in HTML format from the Internet 11 for inclusion in its group of generated EPG Web pages.

The group of generated EPG Web pages is forwarded to Data Streamer 18 and MPEG-2 Encoder 20. Data Streamer 18 formats the group of EPG Web pages into the data packet structure of an MPEG-2 transport stream while retaining the original HTML format. An MPEG-2 system is a multiple channel digital television system wherein each of the multiple channels has a plurality of multiplexed digital television channels composed of MPEG-2 data packets. Data Streamer 18 also generates control maps that associate EPG Web pages with their corresponding location within the MPEG-2 data stream. The generated MPEG-2 transport stream data packets containing the EPG Web pages in HTML format are broadcast in standard MPEG-2 data streams over the downstream broadcast network 22 to settop box 24.

Data Streamer 18 also receives other sets of Web pages (not shown), in addition to EPG Web pages, defining other types of data services. Data Streamer 18 generates control maps defining the correspondence between the MPEG-2 packet identifiers of generated MPEG-2 data packets and respective URLs of the group of EPG Web pages as well as other groups of Web pages. Web page broadcasts are repeated on a continuing basis. In such manner, headend 16 broadcasts a rotating carousel comprising an ensemble of Web pages in HTML format. At least one group of such Web pages forms the EPG of the present invention. A system for generating a rotating carousel comprising an ensemble of HTML Web pages in MPEG-2 data packets with suitable control maps is found in U.S. patent application Ser. No. 09/053562, filed Apr. 4, 1998 and U.S. patent application Ser. No. 09/124572, filed Jul. 29, 1998, assigned to the assignee of the present application.

At the receiving side in settop box 24, the MPEG-2 decoder 26 decodes the received MPEG-2 data streams and reconstructs the EPG Web pages retaining HTML format. EPG information is organized into a group of linked EPG Web pages. Some EPG Web pages, which are expected to be needed on a rapid basis, are stored in cache memory 30. Stored EPG Web pages in cache memory 30 are available for fast display. Other EPG Web pages are downloaded from the rotating data carousel upon specific demand from the web browser 32 and stored in HTML format in work memory 28. While some EPG Web pages are stored in the settop cache memory 30 for ready access, most EPG Web pages are not stored in the settop box, but are retrieved in real time "on the fly" from the rotating carousel of Web pages to work memory 28. The web browser 32 parses, layouts, and renders EPG Web pages from work memory 28 or cache memory 30, to TV screen 34 as needed in response to commands from Viewers. As used herein, cache memory 30 and work memory 28 are terms defined by the intended use of the memory and typically reside in a single memory space.

The broadcast system embodiment of FIG. 1 is described in terms of a cable television system (CATV). However, the present EPG system may be used in any one way broadcast communications system. For example, the present EPG may be used with DBS (direct broadcast satellite), MMDS (microwave multi-point distribution systems), and ordinary terrestrial UHF/VHF or hybrid fiber-coaxial systems. The present EPG may also be used in the downstream communication path of a broadband two-way communication system.

Figure 2:
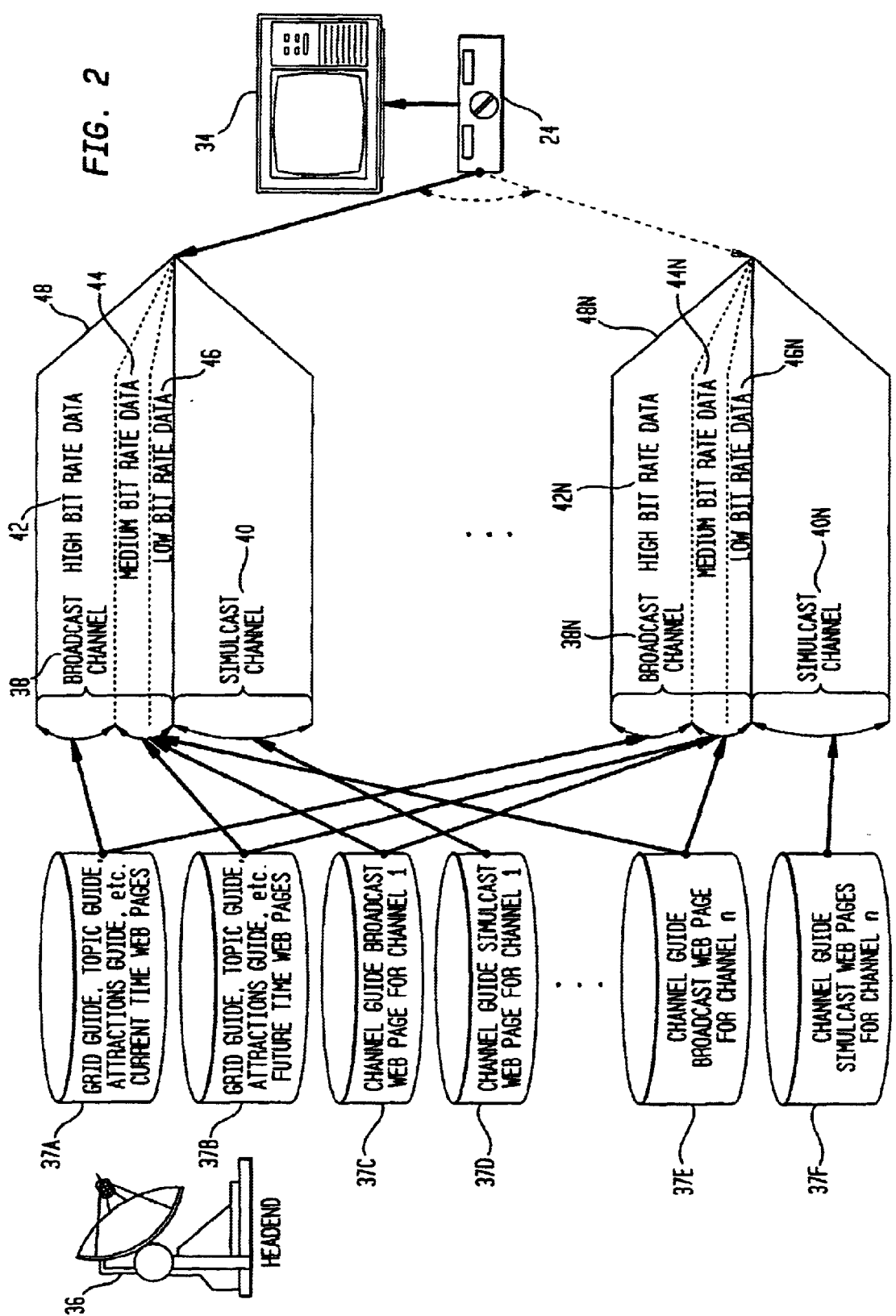
FIG. 2 illustrates the bandwidth allocation scheme for transmitting electronic program data in HTML form in accordance with the present invention.

FIG. 2 shows the bandwidth allocation scheme for transmitting EPG data over a broadcast CATV system. The CATV headend includes a receiving station 36 for receiving the basic EPG data, which is then formatted into a plurality of EPG Web guide pages in HTML format 37A–37F and stored at the CATV headend. The CATV system provides for a plurality of N multiple digital television channels, 48 through 48N. Each digital television channel 48, 48N has a respective associated broadcast channel 38, 38N, and a respective associated simulcast channel 40, 40N, both of which transport HTML Web pages to all settop receivers in MPEG-2 format. Each of the N multiple channel digital television channels 48, 48N contains a plurality of multiplexed digital television channels formatted into a plurality of MPEG data packets.

On each of the broadcast channels, 38, 38N, the same content is repeated in each video channel 48, 48N. On individual simulcast channels 40, 40N different content is broadcast for each respective video channel 48, 48N. Channel bandwidth is allocated among broadcast data. In particular, within the broadcast channels 38, 38N certain data may be transmitted at a high bit rate 42, 42N, other data at medium bit rates 44, 44N or still other data at low bit rates, 46, 46N. In general, HTML EPG Web pages are transmitted in different channels and different speeds.

The EPG Manager generates four different types of EPG Web pages:

Grid Guide Web pages,

Topic Guide Web pages,

Attractions Guide Web pages, and

Channel Guide Web pages,

Each type of EPG Web page presents the TV programming schedule in a different format. Grid Guide, Topic Guide, and Attractions Guide are provided for both the current time and for future times. Since the browser 32 in the settop box 24 (FIG. 1) displays all Web pages conforming to the HTML standard, new types of program guide Web pages can be easily added to the present EPG without having to change the basic Web browser 32 operation of the settop box 24.

Web pages for Grid Guide, Topic Guide, and Attractions Guide for the current time are transmitted at high bit rate 42, 42N in broadcast data streams 38, 38N on all channels. Web pages for Grid Guide, Topic Guide, and Attractions Guide for future times are transmitted at medium 44, 44N to low bit rates 46, 46N in broadcast data streams 38, 38N on all channels 48, 48N. Broadcast Web pages for Channel Guide are transmitted at medium 44, 44N to low bit rates 46, 46N in broadcast data streams 38, 38N on all channels 48, 48N. Simulcast Web pages for Channel Guide are transmitted in simulcast data streams 40, 40N on their corresponding channels 48, 48N. A settop box (24 in FIG. 1) with one tuner can tune to only one channel at a time. Since broadcast data 38, 38N is replicated on each channel 48, 48N, it is available to the settop box tuner on all channels. Simulcast data on a given channel is available to the settop box tuner only when the TV tuner is tuned to that given channel.

The Grid Guide Web pages show the schedule in a time and channel grid format, similar to a TV schedule listed in a newspaper. The Topic Guide Web pages display the programming schedule sorted into a format to show certain topics, such as "movies", "sports", "news", etc. The Attractions Guide Web pages display coming attractions and special event information. The Channel Guide Web pages display the programming information for a particular channel.

As indicated above, the headend server broadcasts a rotating carousel comprising an ensemble of Web pages in HTML format. The rotating carousel contains both broadcast Web pages and simulcast Web pages. Broadcast Web pages are of general interest to all viewers. Simulcast Web pages are related to the contents of the broadcast video programs contained in the digital video channels. Simulcast Web pages are of interest primarily to those viewing the related broadcast video program. Depending on the nature of the program guide content, some program guide Web pages are transmitted as broadcast Web pages, others are transmitted as simulcast Web pages.

The first three types of program guide Web pages (Grid, Topics and Attractions) are of general interest to all viewers and therefore are transmitted in the broadcast channels and called Program Guide Broadcast Events. The Channel Guide Web pages fall into a separate class and are discussed below.

Every Grid Guide Web page contains TV listings for all available channels in a non-overlapping two-hour interval. It takes 84 Grid Guide Web pages to cover TV listings of 7 days starting from the current day. The Grid Guide Homepage is the Web page whose two-hour interval spans over the current time. A two-hour interval is chosen so that the width of the schedule fits within the width of a standard TV screen. Two arrow-shaped bitmap anchors are provided for viewers to navigate to the previous or the next time interval. A group of seven anchors of weekdays allows viewers to go to a Grid Guide Web page of some other day with the same time interval. Once every hour, the Grid Guide Web pages are regenerated so that the current time is always within the first hour covered by the Grid Guide Homepage.

The grid on each Grid Guide Web page is implemented through an HTML table element. Every HTML table detail displays the shortened title of a TV program. The table details are color-coded to indicate the different topics to which the TV programs belong. The shortened title is an HTML anchor that links to a Program Information Web page. The Program Information Web page displays more detailed information about the TV program, such as full title, synopsis, genre, rating, cast, production date, channel name, channel number, show time, and the like. Every TV program has its own Program Information Web page so that the settop box only needs to download, process and display one small HTML page upon demand from viewers.

The EPG manager (14 at the headend 16 in FIG. 1) generates a new group of Topic Guide Web pages and a new Attractions Guide Web page everyday. One of the Web pages, named Topic Guide Homepage, lists all topics with anchors pointing to individual topic Web pages. Viewers can select an HTML anchor corresponding to a topic to go to an individual topic Web page. The individual topic Web page lists the full title, channel name and number, and show time of all TV programs under that topic for the current day. As stated, the program titles are HTML anchors pointing to the related Program Information Web pages.

The underlying MPEG-2 network uses a carousal scheme to transmit data. However, EPG Web pages generated by the EPG manager 14 generally do not have the same priority. If all EPG data were transmitted at the same speed, then in the worst case it would take a few seconds to almost a minute for a viewer to access any EPG Web page. In order to deliver complete EPG information with satisfactory performance, the present invention transmits EPG data at different rates.

The Web pages 37A corresponding to the current time interval and/or the current date are transmitted at high rate 42, 42N for short access time. The Web pages 37B corresponding to near future time (1–3 days) are transmitted at medium rate 44, 44N. The Web pages 37B corresponding to far future time (4–6 days) are transmitted at low rate 46, 46N.

Usually, present time information is of greatest interest to a viewer. By transmitting present time Web pages at higher data rates, access time for the viewer to present time EPG information is shortened. Near future time Web pages and far future time Web pages are of interest to a viewer correspondingly less often. By transmitting near future time Web pages and far future time Web pages at relatively lower data rates, access time for the viewer to future programming information is correspondingly lengthened. Transmitting different Web pages at different data rates achieves a compromise between access time and bandwidth. In terms of bandwidth, dedicating less bandwidth to future time EPG information permits more bandwidth to be devoted to present time EPG information.

Figure 3:
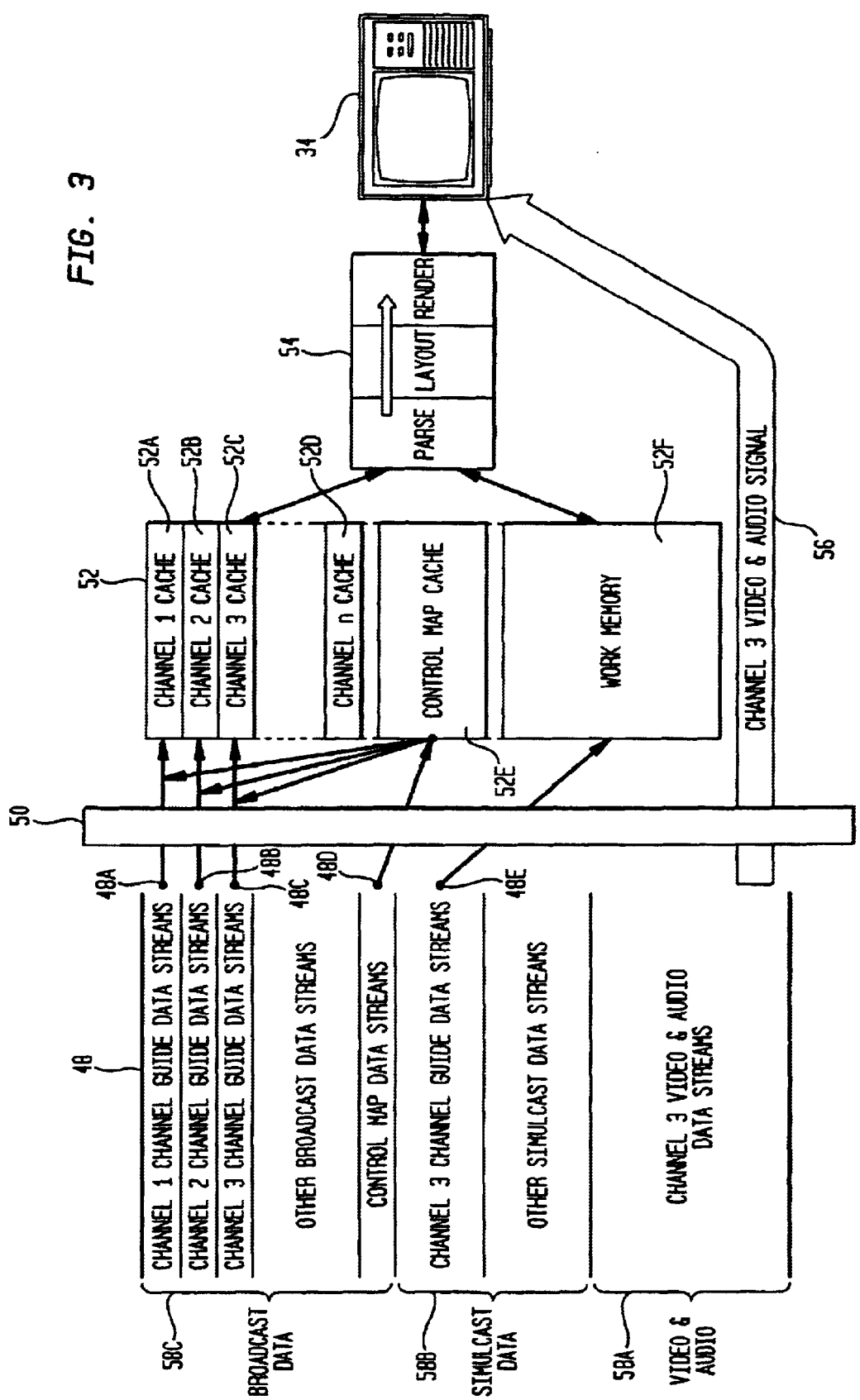
FIG. 3 illustrates the channel guide control mode memory map in a digital television settop in accordance with the present invention.

FIG. 3 displays the digital data format of an MPEG-2 signal and the control memory map for the settop of FIG. 1 (i.e., a memory map of the work memory 28 and cache memory 30 in the settop box 24 of FIG. 1). An MPEG-2 channel 48 (shown containing channel 3 in FIG. 3) is input to an MPEG-2 decoder 50 in the settop box. The settop box also contains a browser program 54 and a memory 52 consisting of a cache memory 52A–52E and a work memory 52F.

The digital MPEG-2 channel 48 consists of several multiplexed data streams: multiplexed digital video and audio data streams 58A, simulcast data streams 58B and broadcast data steams 58C. Multiplexed video and audio data streams 58A correspond to a plurality of multiplexed digital television channels including the video and audio programming for channel 3. Broadcast data 58C include present time channel 3 guide data streams 48C corresponding to the current channel, as well as channel 1 and channel 2 guide data streams 48A, 48B, and further contains present time channel guide data generally corresponding to all the other available viewing channels. Broadcast data 58C yet further includes the control map data streams 48D which are located in a predetermined position (defined by a predetermined MPEG-2 packetID and tableID) in the MPEG-2 data stream 48. Simulcast data 58B contains channel guide data streams 48E corresponding to the present channel 3, as well as other simulcast data steams corresponding to the present channel 3.

In operation, MPEG-2 decoder 50 separates the digital data of the MPEG-2 channel 48. According to the viewer selection, channel 3 video and audio 56 is reconstructed from digital form and displayed on an analog television display 34.

The settop box MPEG-2 decoder 50 synchronizes to the MPEG-2 data stream 48. After synchronization, the decoder 50 then looks in a predetermined MPEG-2 packet location and downloads the control maps 48D for storage in control map cache memory 52E. The stored control maps 52E define the location (by packetID and tableID) of the other broadcast data 58C and simulcast data 58B in the data packets of the MPEG-2 data stream 48. The stored control map 52E tables also define the correspondence between a given Web page URL and the location of the corresponding HTML data in the MPEG-2 data stream.

Broadcast Channel Guide data streams are then separated from the MPEG-2 data stream by the MPEG-2 decoder 50 using the stored control map tables 52E. The broadcast Channel Guide Web page for channel N is stored in Channel N cache 52D in settop box memory. The stored control maps in control map cache 52E provide the association between a Channel Guide data stream and each channel number. For example, the viewer selects Channel Guide mode and switches the TV to channel 3 by pressing a button on the remote control. The browser 54 retrieves the Channel Guide Web page from channel 3 cache 52C, and then parses, layouts, and renders the Web page to TV screen 34. Then assume that the viewer selects an anchor on the displayed Web page (a reference to the URL of another Web page) by pressing a button on the Remote Control. In response, the MPEG-2 decoder 50 selects (decodes "on the fly") the simulcast data stream 48E corresponding to the requested Web page URL (the association to the MPEG-2 data stream is defined by the control map stored in cache memory 52E) and reconstructs the Web page in work memory 52F. The browser 54 retrieves the Web page from work memory 52F, and parses, layouts, and renders the Web page to TV screen 34.

The Channel Guide Web pages display the programming information for a particular channel, which are of primary interest to viewers watching that channel. However, if all Channel Guide Web pages are broadcast as simulcast data 58B, the settop box could not start downloading Channel Guide Web pages for a given channel until the tuner was tuned to the given channel. After tuning to the given channel, a length of time is needed for downloading simulcast data. Due to time required for downloading and processing simulcast data, there is a delay from the time a viewer tunes to a channel to the time channel guide information is displayed on the TV screen. In worst case, the delay, or latency, could be several seconds even for a small Web page.

Accordingly, the present EPG system supports a mode that allows viewers to navigate among channels by clicking channel change buttons on the remote control (channel surfing) and seeing a brief data description of the current program on each channel in real time. In the present context, real time means that the settop box finishes processing and displaying the Web page in a sufficiently short time such that the delay between switching channels and seeing an EPG display is not substantially perceivable to the viewer. To support a real time channel surfing mode, a group of Channel Guide Web pages is broadcast in two separate events: a broadcast event called Channel Guide Broadcast Event and a simulcast event called Channel Guide Simulcast Event.

To implement a real time channel guide mode, the settop box reserves a fixed amount of memory as cache memory 52A-52D for each channel. Broadcast events are available on all channels. Therefore, regardless of the channel currently being viewed, the settop box continuously downloads the Web pages of Channel Guide Broadcast Events in the background and stores the downloaded Web pages in the respective corresponding cache memory 52A–52D. By caching Channel Guide Web pages in advance, the settop box will have something to display immediately when viewers tune to any random channel. A channel guide control map is periodically broadcast to all settop boxes and stored in the control map cache 52E. The channel guide control map associates a Channel Guide Broadcast Event with its channel number.

Figure 4:
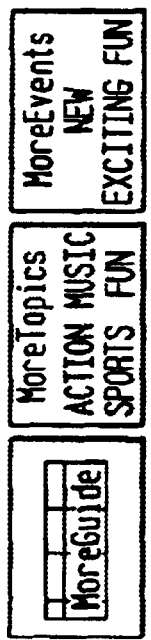
FIG. 4 is a program guide Web page illustrating the Grid Guide Web page that is the HTML Web home page in accordance with the present invention.
Figure 5:
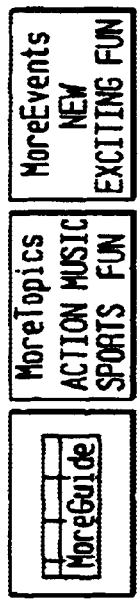
FIG. 5 is a program guide Web page illustrating a Program information Page in HTML format in accordance with the present invention.

FIGS. 4–10 are sample Program Guide Web pages supported by the present invention. FIG. 4 is a sample Grid Guide Web page. When the viewer clicks on the title "Blankman", a Program Information Page is displayed, as shown in FIG. 5. FIG. 6 is a sample Topic Guide Web page. When the viewer clicks on the title "Movies", the Movies Topic Guide Page is displayed, as shown in FIG. 7.

Note that Blankman is listed as one of the movies. If the viewer clicks on the title "Blankman", FIG. 5 will be displayed again. FIG. 8 is a sample Attractions Guide. Attractions and special events are listed under different categories. FIG. 9 is a sample broadcast Channel Guide page. In order to make the Web page as simple as possible for fast processing, a small 54×27 16-color picture is used. All other information is in text format without color or font attributes. When the viewer clicks on the small picture, the Browser goes to a much more complicated Web page as shown in FIG. 10.

FIG. 10 vividly displays the power of constructing an EPG using Web pages in HTML format in accordance with the present invention. FIG. 10 is a real Web page downloaded from Paramount Pictures' on-line Star Trek Web site. The Web page in FIG. 10 contains many advanced HTML features like photo, animation, links to videos and the like. The entire World Wide Web is available as an information source to be assembled into an EPG in accordance with the present invention.

For simplicity, there is only one Web page in each Channel Guide Broadcast Event. The Channel Guide Broadcast Web page includes the name and number of the current channel plus the title, synopsis, genre, cast, rating, and running time of the current program. The size of Channel Guide Broadcast Web page must be smaller than or equal to the cache memory size reserved for each channel 52A–52D. There are also constraints on the complexity of Channel Guide Broadcast Web page. In particular, only simple text and small graphics with no more than 16 colors are allowed. HTML features that take a long time to process like tables, text styles, and large images are not allowed. The restriction to simple text and 16 color graphics on Channel Guide Broadcast Web pages permit fast preparation and display time on settop boxes with limited processing power.

The Web page in a Channel Guide Broadcast Event has an HTML anchor pointing to the homepage of the corresponding simulcast event. If viewers want to see more information about the current program, they can go to the homepage of the related Channel Guide Simulcast Event by selecting the HTML anchor. A Channel Guide Simulcast Event may contain as many Web pages as necessary to give viewers complete information about the current TV program. If the TV program is a movie, then the simulcast Web pages may include reviews, photos, trailer, biographies of the director, the leading actor and actress, celebrity interviews, comments from audience, etc. If the TV program is a special news report, then the simulcast Web pages may include a transcript, background information, biographies of people involved, and other relevant news reports.

By broadcasting Channel Guide Web pages separately in a broadcast event and a simulcast event, settop boxes can not only support traditional program guide services with fast initial response time, but also can add much more content and content formats into the program guide. Representing program guide information in industry standard HTML presents many opportunities for the EPG designer. For example, commercial ads can be easily inserted into program guide Web pages. The content and appearance of future EPGs are limited only by the imagination of EPG designers.

What is claimed is:

1. In a system for providing an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels being formatted into a plurality of MPEG data packets, a method for providing said EPG over said broadcast communications network, said method comprising:

retrieving said basic EPG data from said EPG database at said broadcasting station;

composing a plurality of EPG Web pages in HTML format from said basic EPG data, each of said plurality of EPG Web pages having a respective URL, each of said plurality of EPG Web pages being linked by a cross referenced URL to another of said plurality of EPG Web pages to form an EPG;

storing said plurality of EPG Web pages in HTML format at said broadcasting station to form a plurality of stored HTML EPG Web pages;

formatting said plurality of stored HTML EPG Web pages into said plurality of MPEG data packets while retaining said HTML format;

transmitting said plurality of MPEG data packets in said multiple channel digital television signal over said broadcast communications network;

receiving said plurality of MPEG data packets at said settop decoder to form a received plurality of MPEG data packets including a received plurality of HTML EPG Web pages; and selecting at said settop decoder, at least one of said received plurality of HTML EPG Web pages in said HTML format for display, wherein said plurality of EPG Web pages includes a first EPG Web page representing the current time EPG data and a second EPG Web page representing a future time EPG data, and said step of formatting said plurality of stored HTML EPG Web pages into said plurality of MPEG data packet includes formatting said first EPG Web page to be transmitted over said broadcast communications network at a first data rate and formatting said second EPG Web page to be transmitted over said broadcast communications network a second data rate, wherein said first data rate is greater than said second data rate.

2. In a system for providing an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels being formatted into a plurality of MPEG data packets, a method for providing said EPG over said broadcast communications network, said method comprising:

retrieving said basic EPG data from said EPG database at said broadcasting station;

composing a plurality of EPG Web pages in HTML format from said basic EPG data, each of said plurality of EPG Web pages having a respective URL, each of said plurality of EPG Web pages being linked by a cross referenced URL to another of said plurality of EPG Web pages to form an EPG;

storing said plurality of EPG Web pages in HTML format at said broadcasting station to form a plurality of stored HTML EPG Web pages;

formatting said plurality of stored HTML EPG Web pages into said plurality of MPEG data packets while retaining said HTML format;

transmitting said plurality of MPEG data packets in said multiple channel digital television signal over said broadcast communications network;

receiving said plurality of MPEG data packets at said settop decoder to form a received plurality of MPEG data packets including a received plurality of HTML EPG Web pages; and selecting at said settop decoder, at least one of said received plurality of HTML EPG Web pages in said HTML format for display, wherein said plurality of EPG Web pages includes a first EPG Web page and a second EPG Web page both transmitted on one channel of said multiple channel digital television system, wherein said first EPG Web page is a broadcast EPG Web page also transmitted on each channel of said multiple channel digital television signal and said second EPG Web page is a simulcast EPG Web page transmitted on only said one channel of said multiple channel digital television signal.

3. In a system for transmitting an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels being formatted into a plurality of MPEG data packets, a transmitter method for providing said EPG over said broadcast communications network, said transmitter method comprising:

retrieving said basic EPG data from said EPG database at said broadcasting station;

composing a plurality of EPG Web pages in HTML format from said basic EPG data, each of said plurality of EPG Web pages having a respective URL, each of said plurality of EPG Web pages being linked by a cross referenced URL to another of said plurality of EPG Web pages to form an EPG;

storing said plurality of EPG Web pages in HTML format at said broadcasting station to form a plurality of stored HTML EPG Web pages;

formatting said plurality of stored HTML EPG Web pages into said plurality of MPEG data packets while retaining said HTML format; and transmitting said plurality of MPEG data packets in said multiple channel digital television signal over said broadcast communications network, wherein said plurality of EPG Web pages includes a first EPG Web page representing the current time EPG data and a second EPG Web page representing a future time EPG data, and said step of formatting said plurality of stored HTML EPG Web pages into said plurality of MPEG data packet includes formatting said first EPG Web page to be transmitted over said broadcast communications network at a first data rate and formatting said second EPG Web page to be transmitted over said broadcast communications network a second data rate, wherein said first data rate is greater than said second data rate.

4. In a system for transmitting an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels being formatted into a plurality of MPEG data packets, a transmitter method for providing said EPG over said broadcast communications network, said transmitter method comprising:

retrieving said basic EPG data from said EPG database at said broadcasting station;

composing a plurality of EPG Web pages in HTML format from said basic EPG data, each of said plurality of EPG Web pages having a respective URL, each of said plurality of EPG Web pages being linked by a cross referenced URL to another of said plurality of EPG Web pages to form an EPG;

storing said plurality of EPG Web pages in HTML format at said broadcasting station to form a plurality of stored HTML EPG Web pages;

formatting said plurality of stored HTML EPG Web pages into said plurality of MPEG data packets while retaining said HTML format; and transmitting said plurality of MPEG data packets in said multiple channel digital television signal over said broadcast communications network, wherein said plurality of EPG Web pages includes a first EPG Web page and a second EPG Web page both transmitted on one channel of said multiple channel digital television system, wherein said first EPG Web page is a broadcast EPG Web page also transmitted on each channel of said multiple channel digital television signal and said second EPG Web page is a simulcast EPG Web page transmitted on only said one channel of said multiple channel digital television signal.

5. In a system for providing an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels comprising a plurality of multiplexed digital television channels formatted into a plurality of MPEG data packets, a method for providing said EPG over said broadcast communications network, said method comprising:

retrieving said basic EPG data from said EPG database at said broadcasting station;

composing a plurality of EPG Web pages including a first channel guide EPG Web page and a second channel guide EPG Web page in HTML format from said basic EPG data, wherein said first channel guide EPG Web page is a broadcast channel guide EPG Web page relating to a predetermined channel of said plurality of multiplexed digital television channels, and said second channel guide EPG Web page is a simulcast channel guide EPG Web page relating to said predetermined channel of said plurality of multiplexed digital television channels;

storing said plurality of EPG Web pages in HTML format at said broadcasting station to form a plurality of stored HTML EPG Web pages;

formatting said plurality of stored HTML EPG Web pages into said plurality of MPEG data packets while retaining said HTML format;

transmitting said plurality of MPEG data packets in said multiple channel digital television signal over said broadcast communications network, including transmitting said first channel guide EPG web page on each channel of said multiple channel digital television signal and said second channel guide EPG Web page on only said predetermined channel of said multiple channel digital television signal containing said predetermined channel;

receiving said plurality of MPEG data packets at said settop decoder to form a received plurality of MPEG data packets and a received plurality of HTML EPG Web pages including a received first channel guide EPG web page and a received second channel guide EPG Web page;

caching said received first channel guide EPG Web page in said settop decoder to form a cached first channel guide EPG Web page;

selecting responsive to said viewer tuning said settop decoder to said predetermined channel, said cached first channel guide EPG Web page in said HTML format for display at said settop decoder; and selecting at said settop decoder, said received second channel guide EPG Web page in said HTML format for display while said settop decoder is tuned to said predetermined channel.

6. In a system for providing an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels comprising a plurality of multiplexed digital television channels formatted into a plurality of MPEG data packets, a method for providing said EPG over said broadcast communications network, said method comprising:

retrieving said basic EPG data from said EPG database at said broadcasting station;

composing a plurality of EPG Web pages including a first channel guide EPG Web page and a second channel guide EPG Web page in HTML format from said basic EPG data, wherein said first channel guide EPG Web page is a broadcast channel guide EPG Web page relating to a predetermined channel of said plurality of multiplexed digital television channels, and said second channel guide EPG Web page is a simulcast channel guide EPG Web page relating to said predetermined channel of said plurality of multiplexed digital television channels;

storing said plurality of EPG Web pages in HTML format at said broadcasting station to form a plurality of stored HTML EPG Web pages;

formatting said plurality of stored HTML EPG Web pages into said plurality of MPEG data packets while retaining said HTML format; and transmitting said plurality of MPEG data packets in said multiple channel digital television signal over said broadcast communications network, including transmitting said first channel guide EPG web page on each channel of said multiple channel digital television signal and said second channel guide EPG Web page on only said predetermined channel of said multiple channel digital television signal containing said predetermined channel.

7. In a system receiver for providing an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels comprising a plurality of multiplexed digital television channels formatted into a plurality of MPEG data packets, said EPG manager retrieving said basic EPG data from said EPG database at said broadcasting station and composing a plurality of EPG Web pages including a first channel guide EPG Web page and a second channel guide EPG Web page in HTML format from said basic EPG data, wherein said first channel guide EPG Web page is a broadcast channel guide EPG Web page relating to a predetermined channel of said plurality of multiplexed digital television channels, and said second channel guide EPG Web page is a simulcast channel guide EPG Web page relating to said predetermined channel of said plurality of multiplexed digital television channels, said broadcasting station storing said plurality of EPG Web pages in HTML format to form a plurality of stored HTML EPG Web pages, formatting said plurality of stored HTML EPG Web pages into said plurality of MPEG data packets while retaining said HTML format, and transmitting said plurality of MPEG data packets in said multiple channel digital television signal over said broadcast communications network, including transmitting said first channel guide EPG web page on each channel of said multiple channel digital television signal and said second channel guide EPG Web page on only said predetermined channel of said multiple channel digital television signal containing said predetermined channel; a receiving method for providing said EPG over said broadcast communications network, said receiving method comprising:

receiving said plurality of MPEG data packets at said settop decoder to form a received plurality of MPEG data packets and a received plurality of HTML EPG Web pages including a received first channel guide EPG web page and a received second channel guide EPG Web page;

caching said received first channel guide EPG Web page in said settop decoder to form a cached first channel guide EPG Web page;

selecting responsive to said viewer tuning said settop decoder to said predetermined channel, said cached first channel guide EPG Web page in said HTML format for display at said settop decoder; and selecting at said settop decoder, said received second channel guide EPG Web page in said HTML format for display while said settop decoder is tuned to said predetermined channel.

8. In a system for providing an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels being formatted into a plurality of MPEG data packets, an apparatus for providing said EPG over said broadcast communications network, said apparatus comprising:

means for retrieving said basic EPG data from said EPG database at said broadcasting station;

means for composing a plurality of EPG Web pages in HTML format from said basic EPG data, each of said plurality of EPG Web pages having a respective URL, each of said plurality of EPG Web pages being linked by a cross referenced URL to another of said plurality of EPG Web pages to form an EPG;

means for storing said plurality of EPG Web pages in HTML format at said broadcasting station to form a plurality of stored HTML EPG Web pages;

means for formatting said plurality of stored HTML EPG Web pages into said plurality of MPEG data packets while retaining said HTML format;

means for transmitting said plurality of MPEG data packets in said multiple channel digital television signal over said broadcast communications network;

means for receiving said plurality of MPEG data packets at said settop decoder to form a received plurality of MPEG data packets including a received plurality of HTML EPG Web pages; and means for selecting at said settop decoder, at least one of said received plurality of HTML EPG Web pages in said HTML format for display, wherein said plurality of EPG Web pages includes a first EPG Web page representing the current time EPG data and a second EPG Web page representing a future time EPG data, and said means for formatting said plurality of stored HTML EPG Web pages into said plurality of MPEG data packet includes means for formatting said first EPG Web page to be transmitted over said broadcast communications network at a first data rate and means for formatting said second EPG Web page to be transmitted over said broadcast communications network a second data rate, wherein said first data rate is greater than said second data rate.

9. In a system for providing an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels being formatted into a plurality of MPEG data packets, an apparatus for providing said EPG over said broadcast communications network, said apparatus comprising:

means for retrieving said basic EPG data from said EPG database at said broadcasting station;

means for composing a plurality of EPG Web pages in HTML format from said basic EPG data, each of said plurality of EPG Web pages having a respective URL, each of said plurality of EPG Web pages being linked by a cross referenced URL to another of said plurality of EPG Web pages to form an EPG;

means for storing said plurality of EPG Web pages in HTML format at said broadcasting station to form a plurality of stored HTML EPG Web pages;

means for formatting said plurality of stored HTML EPG Web pages into said plurality of MPEG data packets while retaining said HTML format;

means for transmitting said plurality of MPEG data packets in said multiple channel digital television signal over said broadcast communications network;

means for receiving said plurality of MPEG data packets at said settop decoder to form a received plurality of MPEG data packets including a received plurality of HTML EPG Web pages; and means for selecting at said settop decoder, at least one of said received plurality of HTML EPG Web pages in said HTML format for display, wherein said plurality of EPG Web pages includes a first EPG Web page and a second EPG Web page both transmitted on one channel of said multiple channel digital television system, wherein said first EPG Web page is a broadcast EPG Web page also transmitted on each channel of said multiple channel digital television signal and said second EPG Web page is a simulcast EPG Web page transmitted on only said one channel of said multiple channel digital television signal.

10. In a system for transmitting an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels being formatted into a plurality of MPEG data packets, a transmitter apparatus for providing said EPG over said broadcast communications network, said transmitter apparatus comprising:

means for retrieving said basic EPG data from said EPG database at said broadcasting station;

means for composing a plurality of EPG Web pages in HTML format from said basic EPG data, each of said plurality of EPG Web pages having a respective URL, each of said plurality of EPG Web pages being linked by a cross referenced URL to another of said plurality of EPG Web pages to form an EPG;

means for storing said plurality of EPG Web pages in HTML format at said broadcasting station to form a plurality of stored HTML EPG Web pages;

means for formatting said plurality of stored HTML EPG Web pages into said plurality of MPEG data packets while retaining said HTML format; and means for transmitting said plurality of MPEG data packets in said multiple channel digital television signal over said broadcast communications network, wherein said plurality of EPG Web pages includes a first EPG Web page representing the current time EPG data and a second EPG Web page representing a future time EPG data, and said means for formatting said plurality of stored HTML EPG Web pages into said plurality of MPEG data packet includes means for formatting said first EPG Web page to be transmitted over said broadcast communications network at a first data rate and means for formatting said second EPG Web page to be transmitted over said broadcast communications network a second data rate, wherein said first data rate is greater than said second data rate.

11. In a system for transmitting an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels being formatted into a plurality of MPEG data packets, a transmitter apparatus for providing said EPG over said broadcast communications network, said transmitter apparatus comprising:

means for retrieving said basic EPG data from said EPG database at said broadcasting station;

means for composing a plurality of EPG Web pages in HTML format from said basic EPG data, each of said plurality of EPG Web pages having a respective URL, each of said plurality of EPG Web pages being linked by a cross referenced URL to another of said plurality of EPG Web pages to form an EPG;

means for storing said plurality of EPG Web pages in HTML format at said broadcasting station to form a plurality of stored HTML EPG Web pages;

means for formatting said plurality of stored HTML EPG Web pages into said plurality of MPEG data packets while retaining said HTML format; and means for transmitting said plurality of MPEG data packets in said multiple channel digital television signal over said broadcast communications network, wherein said plurality of EPG Web pages includes a first EPG Web page and a second EPG Web page both transmitted on one channel of said multiple channel digital television system, wherein said first EPG Web page is a broadcast EPG Web page also transmitted on each channel of said multiple channel digital television signal and said second EPG Web page is a simulcast EPG Web page transmitted on only said one channel of said multiple channel digital television signal.

12. In a system for providing an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels comprising a plurality of multiplexed digital television channels formatted into a plurality of MPEG data packets, an apparatus for providing said EPG over said broadcast communications network, said apparatus comprising:

means for retrieving said basic EPG data from said EPG database at said broadcasting station;

means for composing a plurality of EPG Web pages including a first channel guide EPG Web page and a second channel guide EPG Web page in HTML format from said basic EPG data, wherein said first channel guide EPG Web page is a broadcast channel guide EPG Web page relating to a predetermined channel of said plurality of multiplexed digital television channels, and said second channel guide EPG Web page is a simulcast channel guide EPG Web page relating to said predetermined channel of said plurality of multiplexed digital television channels;

means for storing said plurality of EPG Web pages in HTML format at said broadcasting station to form a plurality of stored HTML EPG Web pages;

means for formatting said plurality of stored HTML EPG Web pages into said plurality of MPEG data packets while retaining said HTML format;

means for transmitting said plurality of MPEG data packets in said multiple channel digital television signal over said broadcast communications network, including transmitting said first channel guide EPG web page on each channel of said multiple channel digital television signal and said second channel guide EPG Web page on only said predetermined channel of said multiple channel digital television signal containing said predetermined channel;

means for receiving said plurality of MPEG data packets at said settop decoder to form a received plurality of MPEG data packets and a received plurality of HTML EPG Web pages including a received first channel guide EPG web page and a received second channel guide EPG Web page;

means for caching said received first channel guide EPG Web page in said settop decoder to form a cached first channel guide EPG Web page;

means for selecting responsive to said viewer tuning said settop decoder to said predetermined channel, said cached first channel guide EPG Web page in said HTML format for display at said settop decoder; and means for selecting at said settop decoder, said received second channel guide EPG Web page in said HTML format for display while said settop decoder is tuned to said predetermined channel.

13. In a system for providing an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels comprising a plurality of multiplexed digital television channels formatted into a plurality of MPEG data packets, an apparatus for providing said EPG over said broadcast communications network, said apparatus comprising:

means for retrieving said basic EPG data from said EPG database at said broadcasting station;

means for composing a plurality of EPG Web pages including a first channel guide EPG Web page and a second channel guide EPG Web page in HTML format from said basic EPG data, wherein said first channel guide EPG Web page is a broadcast channel guide EPG Web page relating to a predetermined channel of said plurality of multiplexed digital television channels, and said second channel guide EPG Web page is a simulcast channel guide EPG Web page relating to said predetermined channel of said plurality of multiplexed digital television channels;

means for storing said plurality of EPG Web pages in HTML format at said broadcasting station to form a plurality of stored HTML EPG Web pages;

means for formatting said plurality of stored HTML EPG Web pages into said plurality of MPEG data packets while retaining said HTML format; and means for transmitting said plurality of MPEG data packets in said multiple channel digital television signal over said broadcast communications network, including transmitting said first channel guide EPG web page on each channel of said multiple channel digital television signal and said second channel guide EPG Web page on only said predetermined channel of said multiple channel digital television signal containing said predetermined channel.

14. In a system receiver for providing an electronic program guide (EPG) to a viewer over a broadcast communications network, said broadcast communications network including a broadcasting station for transmitting on a broadcast medium, and a settop decoder at said viewer's location coupled to said broadcast medium, said broadcasting station including an EPG manager coupled to an EPG database containing basic EPG data, said broadcast communications network further including a multiple channel digital television signal, each of said multiple channels comprising a plurality of multiplexed digital television channels formatted into a plurality of MPEG data packets, said EPG manager retrieving said basic EPG data from said EPG database at said broadcasting station and composing a plurality of EPG Web pages including a first channel guide EPG Web page and a second channel guide EPG Web page in HTML format from said basic EPG data, wherein said first channel guide EPG Web page is a broadcast channel guide EPG Web page relating to a predetermined channel of said plurality of multiplexed digital television channels, and said second channel guide EPG Web page is a simulcast channel guide EPG Web page relating to said predetermined channel of said plurality of multiplexed digital television channels, said broadcasting station storing said plurality of EPG Web pages in HTML format to form a plurality of stored HTML EPG Web pages, formatting said plurality of stored HTML EPG Web pages into said plurality of MPEG data packets while retaining said HTML format, and transmitting said plurality of MPEG data packets in said multiple channel digital television signal over said broadcast communications network, including transmitting said first channel guide EPG web page on each channel of said multiple channel digital television signal and said second channel guide EPG Web page on only said predetermined channel of said multiple channel digital television signal containing said predetermined channel; a receiving apparatus for providing said EPG over said broadcast communications network, said receiving apparatus comprising:

means for receiving said plurality of MPEG data packets at said settop decoder to form a received plurality of MPEG data packets and a received plurality of HTML EPG Web pages including a received first channel guide EPG web page and a received second channel guide EPG Web page;

means for caching said received first channel guide EPG Web page in said settop decoder to form a cached first channel guide EPG Web page;

means for selecting responsive to said viewer tuning said settop decoder to said predetermined channel, said cached first channel guide EPG Web page in said HTML format for display at said settop decoder; and means for selecting at said settop decoder, said received second channel guide EPG Web page in said HTML format for display while said settop decoder is tuned to said predetermined channel.

\* \* \* \* \*